United States Patent
Zansky et al.

(10) Patent No.: US 7,312,962 B1
(45) Date of Patent: Dec. 25, 2007

(54) INTELLIGENT OVERCURRENT PROTECTION FOR POWER SUPPLIES

(75) Inventors: Zoltan Zansky, San Carlos, CA (US); Bill Jacobsen, Sunnyvale, CA (US); Bob Schmiedeskamp, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 343 days.

(21) Appl. No.: 10/329,854

(22) Filed: Dec. 26, 2002

(51) Int. Cl.
*H02H 7/00* (2006.01)

(52) U.S. Cl. .......................... 361/30; 361/18

(58) Field of Classification Search ................ 361/18, 361/79, 86, 87, 91.1, 91.2, 93.7–93.9, 93.1, 361/30; 363/65; 323/283
See application file for complete search history.

(56) References Cited

U.S. PATENT DOCUMENTS

| | | | |
|---|---|---|---|
| 4,618,779 A * | 10/1986 | Wiscombe | 307/60 |
| 5,428,523 A * | 6/1995 | McDonnal | 363/71 |
| 5,428,524 A * | 6/1995 | Massie | 363/79 |
| 5,477,132 A * | 12/1995 | Canter et al. | 323/282 |
| 5,659,208 A * | 8/1997 | Kimble et al. | 307/82 |
| 5,828,140 A * | 10/1998 | Shih | 307/18 |
| 6,166,934 A * | 12/2000 | Kajouke et al. | 363/65 |
| 6,301,133 B1 * | 10/2001 | Cuadra et al. | 363/65 |
| 6,385,024 B1 * | 5/2002 | Olson | 361/87 |
| 6,738,246 B1 * | 5/2004 | Strumpler | 361/93.1 |

* cited by examiner

*Primary Examiner*—Michael Sherry
*Assistant Examiner*—Danny Nguyen
(74) *Attorney, Agent, or Firm*—Suiter Swantz pc llo

(57) ABSTRACT

The present invention is a method and system for preventing an output of current greater than a desired amount for a redundant power supply system. In an embodiment of the present invention, redundant power supplies may be shut down when the sum of the output currents from the redundant power supplies is greater than a specified maximum current for a single power supply. Additionally, if a power supply should operate outside of desired voltage and current specifications, the power supply may be disabled while the method and system of the present invention monitor the output current of a redundant power supply.

12 Claims, 3 Drawing Sheets

INTELLIGENT OVERCURRENT PROTECTION FOR POWER SUPPLIES

FIELD OF THE INVENTION

The present invention generally relates to the field of power supplies, and more particularly to a method and system for preventing an output of current greater than a desired level from redundant power supplies.

BACKGROUND OF THE INVENTION

Electronic data storage is rapidly replacing paper storage as a preferred mechanism for storage of information. Additionally, electronic data storage provides the ability for users to store and access data remotely through a network, such as the Internet. With such a reliance on electronic data storage, storage systems must provide constant availability and high reliability.

In order to ensure reliable performance, storage systems employ redundant systems. For example, data is stored in multiple locations such that should one storage device fail, a redundant set of data may be accessible on another storage device. Another type of redundant system is the use of multiple power supplies. Storage systems receive power from power supplies during operation. If a power supply fails, a redundant power supply may provide power to the storage system without losing storage system availability.

A problem associated with redundant power supplies is the summation of available output currents of multiple power supplies. When a catastrophic failure like a short circuit occurs, the available short circuit current is the total amount of current for each power supply. This amount of current may damage components within the storage system and may cause a catastrophic failure. While individual power supplies typically include overcurrent protection, when power supplies are coupled in parallel, an overcurrent condition may occur which would not be prevented by each power supply's integrated overcurrent protection. Consequently, a method and system for preventing an output of current greater than a desired level from redundant power supplies is necessary to avoid damage to components from high current while ensuring redundancy.

SUMMARY OF THE INVENTION

Accordingly, the present invention is directed to a method and system for preventing an output of current greater than a desired level from a redundant power supply system. In an embodiment of the present invention, redundant power supplies may be shut down when the sum of the output currents from the redundant power supplies is more than a specified maximum current. Additionally, if a power supply should operate outside of desired voltage and current specifications, the power supply may be disabled while the method and system of the present invention monitor the output current of a redundant power supply.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
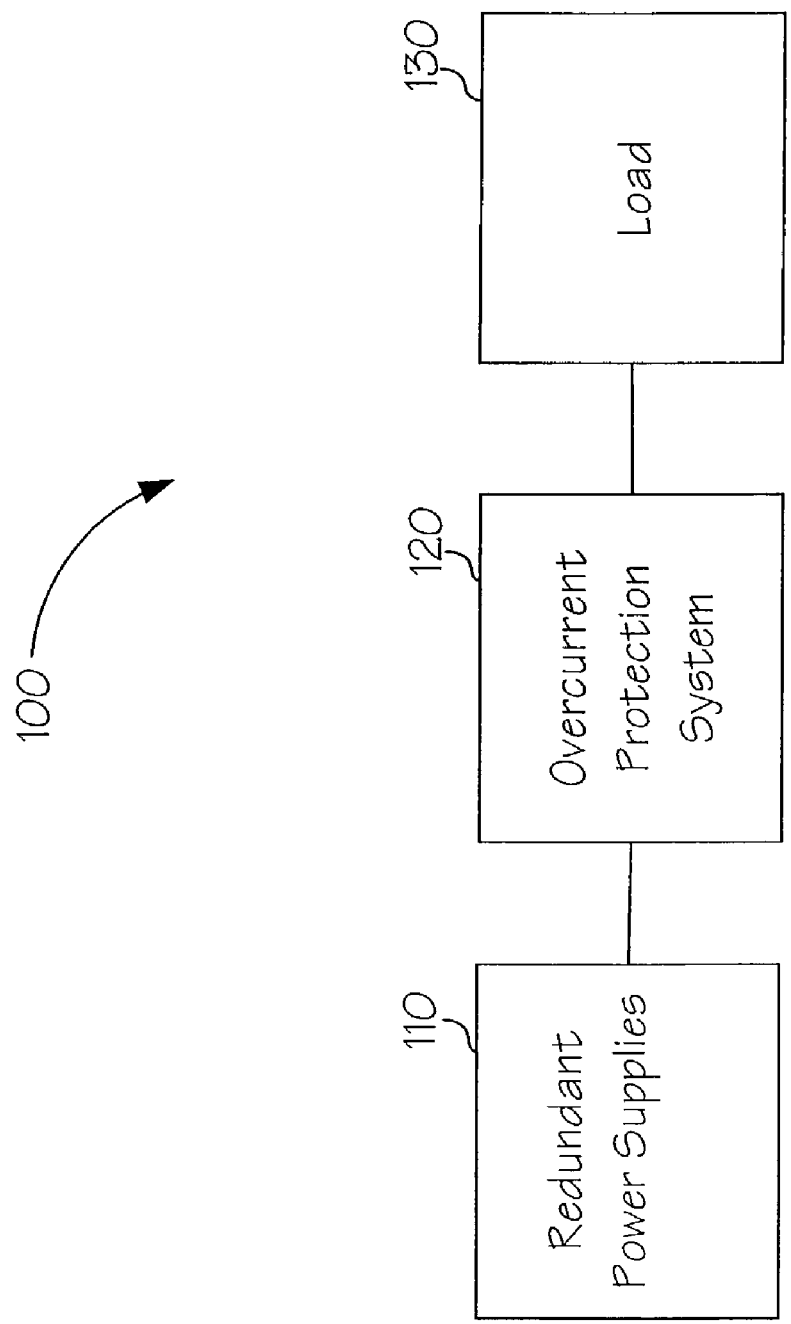
FIG. 1 depicts a block diagram of a power supply system in accordance with an embodiment of the present invention.

Referring to FIG. 1, a power supply system 100 in accordance with an embodiment of the present invention is shown. In an embodiment of the invention, power supply system 100 may include redundant power supplies 110, an overcurrent protection system 120, and a load 130. Redundant power supplies 110 may include a plurality of individual power supplies in which the available output current for each power supply is summed. Each redundant power supply may be an alternating current (AC) to direct current DC (AC/DC) conversion type or DC/DC conversion type in alternative embodiments of the present invention.

Redundant power supplies 110 may be employed when reliable electrical power is required for a load 130. In one embodiment of the invention, load 130 may refer to a data storage system. Data storage systems require reliable power to ensure data integrity and constant data availability.

When a number (N) of redundant power supplies sum available output currents, a failure such as a short circuit may result in an available short circuit of (N) times the short circuit current of each power supply. Thus, a redundant power supply system of three power supplies may produce a short circuit current of three times the short circuit current for a single power supply. This may cause component failure within the load 130 and the redundant power supplies 110. Additionally, a temperature related hazard, even component physical damage (possibly, in the extreme, even burning or charring) may occur when a large current produces excessive levels of heat. Overcurrent protection system 120 may prevent a large current flow that may cause component failure and hazards within the power supply system 100. It should be understood by those with ordinary skill in the art that overcurrent refers to an amount of current greater than a desired level. In one embodiment of the invention, if the available short circuit current is greater than a desired level, redundant power supplies 110 may be disabled to prevent damage to components of the redundant power supplies 110 and the load 130.

Figure 2:
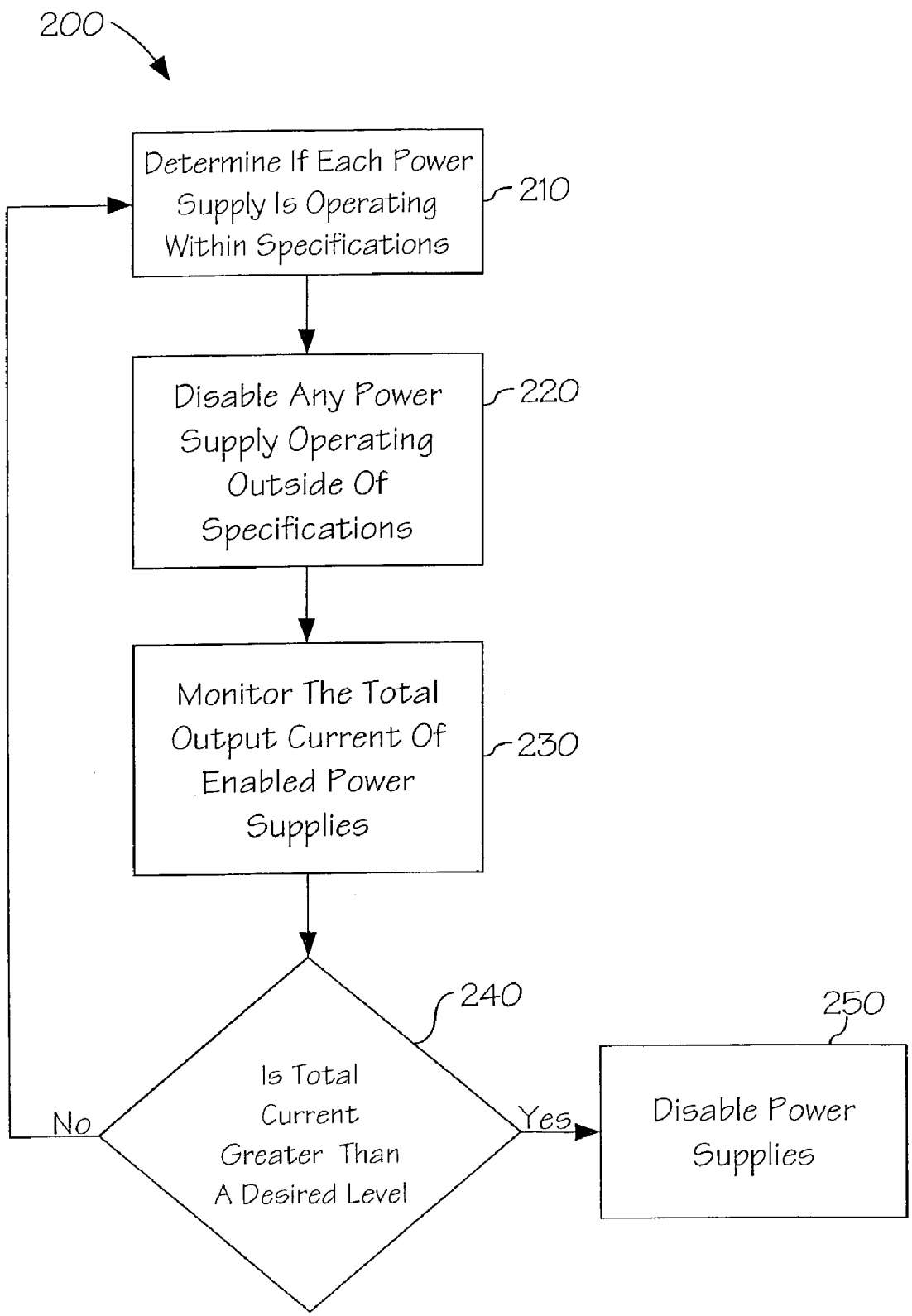
FIG. 2 depicts a process for preventing an output of current greater than a desired level.

Referring now to FIG. 2, a process 200 for preventing an overcurrent is shown. In one embodiment of the invention, process 200 may be implemented by overcurrent protection system 120 of FIG. 1. Process 200 may begin by determining if each power supply of a redundant power supply system is operating within specifications 210. Specifications may include a maximum voltage and a maximum current setting. Power supplies may include a "power good" signal which may be utilized to indicate whether a power supply is operating within a maximum voltage setting and a maximum current setting. If a power supply is operating outside of specifications, then the power supply may be disabled 220.

It should be understood by those with ordinary skill in the art that specifications may also include internal temperature, outside ambient temperature, input voltage, harmonics and other design factors associated with power supplies.

The total output current of enabled power supplies may be monitored 230. In an embodiment of the invention, a current sense line from each power supply may be coupled to an overcurrent protection system 120 of FIG. 1. The current sense line may include a digital signal indicative of an amount of output current for each individual power supply. Summing the individual amounts of output current from each enabled power supply may provide a total output current. A comparison of the total output current with a desired level may be completed 240. When the total amount of output current of all active power supplies is greater than a desired level, individual power supplies may be disabled 250. It is contemplated that desired current level may be a maximum allowable current level to ensure proper operation, however, desired level may be adjusted to meet the requirements of any type of application. Individual power supplies may include an enable switch. An enable signal line may be coupled to each individual power supply from an overcurrent protection system 120 of FIG. 1. When the enable signal line is disabled, an individual power supply may be shut-down. Advantageously, this may prevent a current being delivered to a load greater than a desired level.

In an advantageous aspect of the present invention, process 200 of the present invention may be periodically or continuously repeated. Thus, if the total amount of current is less than a desired level, the process may repeat and begin determining if each power supply is operating within specifications 210. This may ensure overcurrent protection for a redundant power supply system on a continuous basis.

Figure 3:
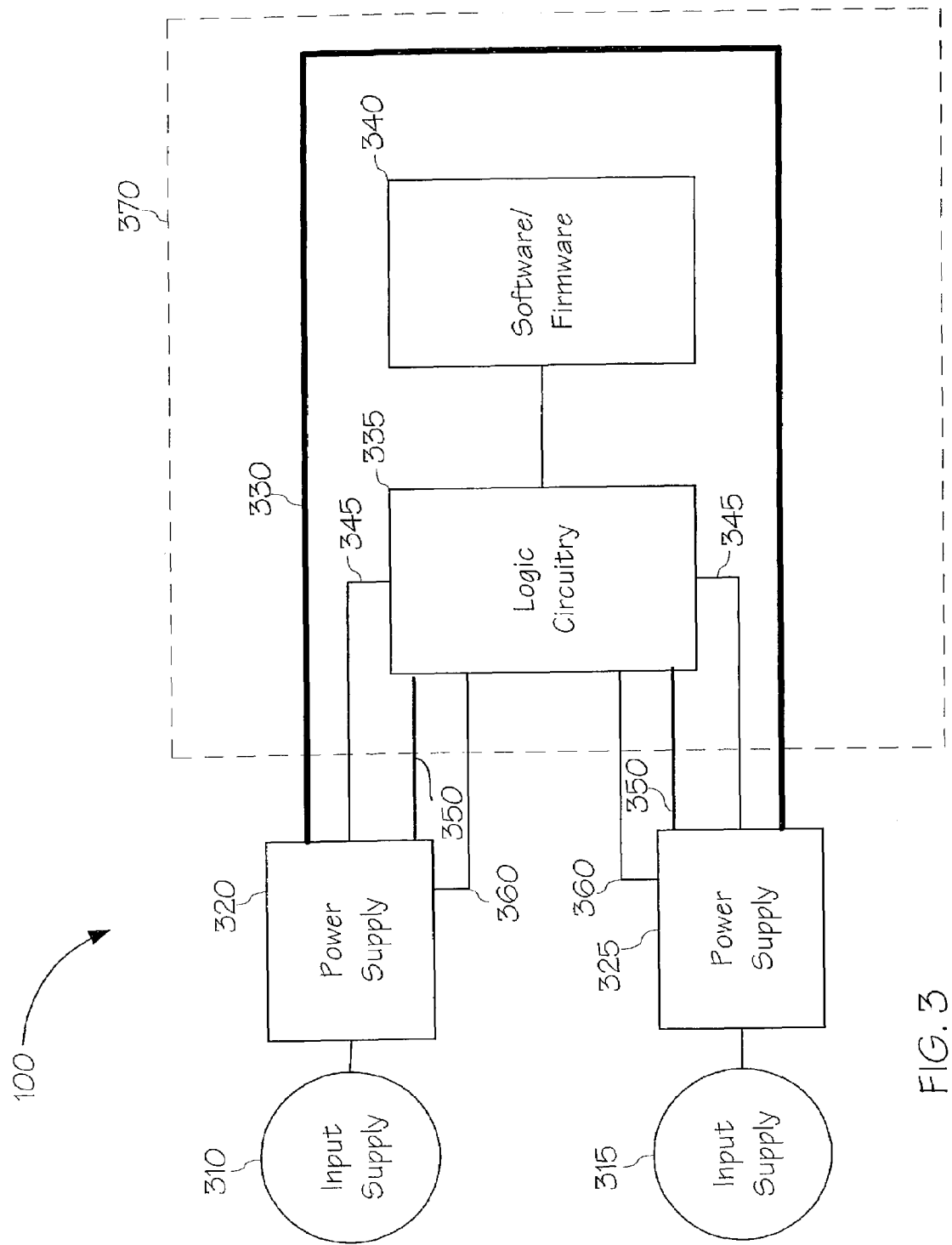
FIG. 3 depicts a power supply system in accordance with the present invention.

Referring now to FIG. 3, a power supply system 100 in accordance with the present invention is shown. FIG. 3 represents an embodiment of power supply system 100 of FIG. 1. Power supply system 100 may execute process 200 of FIG. 2 to prevent the generation of an undesirably large current created from current sharing of parallel power supplies. Power supply system 100 may include multiple input supplies. Input supplies may be a DC source or an AC source in alternative embodiments of the invention. Each input supply 310, 315 may be coupled to a power supply 320, 325. In an embodiment of the invention, power supply 320, 325 may convert an alternating current supply to a direct current supply. In another embodiment, power supply 320, 325 may convert a large unregulated DC voltage to a lower DC voltage. It should be understood by those with ordinary skill in the art that power supplies may be utilized in accordance with the present invention to convert AC to DC, DC to AC, DC to DC along with increasing or decreasing voltage current supplies which would not depart from the scope and spirit of the present invention.

In an embodiment of the invention, a DC voltage 330 bus may be formed from the outputs of each power supply 320, 325. DC voltage bus 330 may provide a regulated DC voltage for a load 370, such as a storage system. Use of multiple power supplies 320, 325 may provide redundancy in that if one power supply 320, 325 should fail, a single power supply 320, 325 may not be operational but the other power supply may be functional.

Each power supply 320, 325 may be coupled to logic circuitry 335. Logic circuitry 335 and software/firmware 340 may prevent the generation of a current greater than a desired level functioning as the overcurrent protection system 120 of FIG. 1. In one embodiment of the invention, a current sense line 345 may be coupled to logic circuitry 335 alerting the logic circuitry 335 to an amount of current output from each power supply 320, 325. The current sense line may include a digital signal that, when processed through logic circuitry 335, may be indicative of an amount of current output from each power supply. It should be understood by those with ordinary skill in the art that multiple types of current measuring methods may be employed in accordance with the present invention without departing from the scope and spirit of the present invention.

A "power good" line 350 may indicate whether the output of each power supply 320, 325 is within specifications. For example, if the output from the "power good" signal 350 is high, then the power supply 320, 325 may be operating under a maximum current level and within the specified output voltage range. An enable signal 360 may be utilized to enable or disable the operation of each power supply 320, 325. For example, when enable signal 360 is high, the power supply 320, 325 may operate normally. However, when enable signal is low, power supply 320, 325 may be disabled.

Turning to the operation of power supply system 100, if a "power good" signal 350 is high, logic circuitry 335 may continue to provide an enable signal 360 for the power supply. Thus, the power supply 320, 325 may continue to operate normally. The total amount of output current from the power supplies may be determined by summing the individual output currents received from each power supply 320, 325 as determined from each current sense line 345 of each power supply 320, 325. The total amount of current may be compared with a maximum amount or a desired level. Software/firmware 340 of the present invention may compare the total amount of current derived by summing an amount of current output from each power supply 320, 325 with a maximum current amount entered for use within the particular application. If the total amount of current exceeds the maximum amount, software/firmware 340 may alert logic circuitry 335 to disable the power supplies via enable signal line 360. The depicted software/firmware block 340 represents any various hardware, software and/or firmware implementations, for example, a programmable logic array or other circuitry, or program code executing on a processor or controller.

An advantageous aspect of the present invention is the ability to adjust the maximum amount of overcurrent. Some applications may be unusually sensitive to large current while other applications may be damaged only by extremely large current. As a result, the amount of maximum current may be adjusted to fit within the specific application of the user. Setting and adjusting of a maximum current amount may be easily accomplished through input of a maximum amount within software/firmware 340 of the present invention via an interface.

In an exemplary embodiment of the invention, a power supply may be specified to supply five volts at a maximum output current of fifty amperes. Overcurrent protection within the power supply may shut down the power supply if the current exceeds sixty-five amperes. If two power supplies are coupled in parallel to allow summing of output current from each power supply, then the maximum amount of current could reach one hundred thirty amperes (sixty amperes from each power supply) providing six hundred seventy-five (675) watts of power. An amount of current of one hundred thirty amperes may cause component failure/damage during an overcurrent condition caused by a malfunction within the system being powered by the redundant power supplies.

Typically, systems being powered do not require all of the available power from a single power supply. For example, 70% of the power from a single redundant power supply plugged into the system may be suitable for the particular application. 70% of sixty-five amperes is approximately 46 amperes, thus a maximum amount of current available for the one or two operational parallel power supplies may be set at 46 amperes. This would reduce the amount of available power to 46 amperes*5 volts=230 watts, a significant reduction. A maximum current of 46 amperes and power of 230 watts may be within a safe level to prevent overloading of components. Thus, in accordance with the present invention, the maximum amount of overcurrent available from the one or two operational parallel power supplies may be set at 46 amperes within the software/firmware 340 of FIG. 3 regardless of whether one or two power supplies are operational. As stated previously, the maximum current amount may be adjusted by setting the amount to a desired level within the software/firmware 340 of the present invention.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for preventing an overcurrent, comprising:
   (a) means for determining if each power supply of a plurality of power supplies is operating within a list of specifications;
   (b) means for disabling each power supply that is operating outside said list of specifications; and
   (c) means for monitoring a total amount of output current of said plurality of power supplies; wherein one or more of said plurality of power supplies is shut down when said total amount of output current is greater than a desired amount of current, said desired amount of current being less than a maximum current output capable of being supplied by each power supply, wherein said power supplies are shut down by disabling an enable signal coupled to each power supply, the total amount of output current being monitored by summing individual amounts of output current supplied by each power supply through a current sense line coupled to each power supply, wherein upon a first power supply is disabled for operating outside said list of specifications, said total amount of output current from enabled power supplies is still monitored.

2. The system as claimed in claim 1, wherein said list of specifications includes a voltage range.

3. The system as claimed in claim 1, wherein said list of specifications includes a current range.

4. The system as claimed in claim 1, wherein said means for monitoring said total amount of output current sums an output current of each power supply.

5. The system as claimed in claim 4, wherein said output current of each power supply is determined by measuring a signal indicative of said output current.

6. The system as claimed in claim 1, wherein said desired amount of current is adjustable.

7. A power supply system, comprising:
   a first input supply;
   a first power supply coupled to said first input supply, said first power supply receiving a first input voltage from said first input supply and providing a first output supply;
   a second input supply;
   a second power supply coupled to said second input supply, said second power supply receiving a second input voltage from said first input supply and providing a second output supply;
   a bus coupled to said first power supply and said second power supply; said bus receiving said first output supply and said second output supply; and
   means for monitoring a total amount of output current of said first power supply and said second power supply provided to said bus, wherein one or more of said first power supply and said second power supply is shut down when said total amount of output current on said bus is greater than a desired amount of current, said desired amount of current being less than a maximum current output capable of being supplied by each power supply, said first power supply and said second power supply are shut down by disabling an enable signal coupled to said first power supply and said second power supply, the total amount of output current being monitored by summing individual amounts of output current supplied by said first power supply and said second power supply through a current sense line coupled to each power supply.

8. The power supply system of claim 7, wherein said first input supply and said second input supply provide an unregulated DC voltage.

9. The power supply system of claim 8, wherein said first power supply and said second power supply are DC/DC power supplies which receive an unregulated DC voltage and provide a regulated DC voltage.

10. The system as claimed in claim 7, wherein said desired amount of current is adjustable.

11. A power supply system, comprising:
    a first input supply providing a first unregulated DC voltage;
    a first power supply coupled to said first input supply, said first power supply receiving said first unregulated DC voltage and providing a first regulated DC voltage;
    a second input supply providing a second unregulated DC voltage;
    a second power supply coupled to said second input supply, said second power supply receiving said second unregulated DC voltage and providing a second regulated DC voltage;
    a bus coupled to said first power supply and said second power supply; said bus receiving said first regulated DC voltage and said second regulated DC voltage; and
    means for monitoring a total amount of output current of said first power supply and said second power supply provided to said bus, wherein one or more of said first power supply and said second power supply is shut down when said total amount of output current on said bus is greater than a desired amount of current, said desired amount of current being less than a maximum current output capable of being supplied by each power supply, said first power supply and said second power supply are shut down by disabling an enable signal coupled to said first power supply and said second power supply, the total amount of output current being monitored by summing individual amounts of output current supplied by said first power supply and said second power supply through a current sense line coupled to each power supply.

12. The system as claimed in claim 11, wherein said desired amount of current is adjustable.

* * * * *